United States Patent
Lee et al.

(10) Patent No.: US 6,310,705 B1
(45) Date of Patent: Oct. 30, 2001

(54) DUPLEX OUTDOOR BASE STATION TRANSCEIVER SUBSYSTEM UTILIZING A HYBRID SYSTEM OF A HIGH POWER AMPLIFIER AND AN OPTIC ANTENNA

(75) Inventors: Jun-Sung Lee; Dae-Hyun Sim, both of Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/134,587

(22) Filed: Aug. 14, 1998

(30) Foreign Application Priority Data

Aug. 14, 1997 (KR) .................................................. 97-38901

(51) Int. Cl.[7] .................................................. H04B 10/00
(52) U.S. Cl. ..................... 359/152; 359/145; 379/56.1; 455/73; 455/562
(58) Field of Search ..................... 359/145, 152, 359/167; 379/56.1–56.3; 455/73, 561, 562

(56) References Cited

U.S. PATENT DOCUMENTS

| | | | |
|---|---|---|---|
| 5,339,184 | 8/1994 | Tang | 359/145 |
| 5,404,572 | * 4/1995 | Ishii | 455/67.4 |
| 5,457,557 | * 10/1995 | Zarem et al. | 359/121 |
| 5,479,595 | 12/1995 | Isrealsson | 359/124 |
| 5,689,355 | * 11/1997 | Okubo et al. | 359/179 |
| 5,844,705 | * 12/1998 | Rutledge | 359/167 |
| 5,936,754 | * 8/1999 | Ariyavisitakul et al. | 359/145 |
| 5,969,837 | * 10/1999 | Farber et al. | 359/132 |
| 6,069,721 | * 5/2000 | Oh et al. | 359/145 |

* cited by examiner

Primary Examiner—Kinfe-Michael Negash
(74) Attorney, Agent, or Firm—Dilworth & Barrese, LLP

(57) ABSTRACT

The invention relates to a duplex outdoor base station utilizing a hybrid system of a high amplifier and optic antenna to communicate over both radio and optic frequencies. The base station includes: a RF front end part interfaced with an optic antenna; a receiver interface unit for transmitting the received signal to the RF front end part after amplifying a received signal; a transceiver unit for transmitting the transmitted/received signal to the RF front end part; a base station transceiver subsystem (BTS) test unit, coupled to the front end part, for performing a self-diagnosis of a BTS; and an optic antenna interface unit for connecting an optic antenna system with the receiver interface unit. This base station transceiver subsystem (BTS) is a kind of hybrid system for simultaneously operating an optic antenna and a radio frequency antenna.

8 Claims, 5 Drawing Sheets

DUPLEX OUTDOOR BASE STATION TRANSCEIVER SUBSYSTEM UTILIZING A HYBRID SYSTEM OF A HIGH POWER AMPLIFIER AND AN OPTIC ANTENNA

FIELD OF THE INVENTION

The present invention relates to a duplex outdoor base station transceiver subsystem utilizing a hybrid system including a High Power Amplifier (HPA) and an Optic Antenna (OA). More particularly, the duplex outdoor base station transceiver subsystem is designed for combined use transmitting/receiving both radio and optical communication signals and is able to provide a communication service to shadowing areas or non-heavy traffic areas.

DESCRIPTION OF THE RELATED ART

A cellular communication system, such as a Personal Communication Service (PCS) and a Code Division Multiple Access (CDMA), includes a plurality of Base station Transceiver Subsystem (BTS) which provide communication service to mobile stations, a plurality of Base Station Controller (BSC), a Base Station Manager system (BSM), a Mobile Switching Center (MSC) and a Location Registering System (LRS).

The term "cellular system" refers to a communication system having a "cell" as one unit of communication coverage. The term "cell" refers to an area where each base station provides service. Typically, each cell is divided into 3 sectors, and the cell coverage is expanded into a BTS area, a BSC area and a MSC area. Data, which is transmitted from a MSC, for instance, voice, is transmitted through a BSC to a transceiver unit of each cell. A base station transceiver subsystem (BTS), for serving mobile telephone subscribers, includes an out-door system having an antenna and coaxial cable installed outside and an indoor system having RF transmit/receive equipment installed inside.

The indoor system generally includes: a RF front End Unit for transmitting receiving a RF signal; a transceiver unit for converting between a RF signal and an intermediate frequency signal; an intermediate frequency amplifier for amplifying an intermediate frequency; a digital unit for modulating and demodulating a transmit/receive signal; and a BTS Test Unit (BTU) for performing a self-diagnosis of a BTS. The RF front end unit further includes: a Directional Coupler (D/C) for connection with an antenna; a band pass filter (BPF) for filtering a signal; a low noise amplifier (LNA) for amplifying the signal; and a power divider and combiner (PD/PC) respectively for dividing and combining the signal to and from a transmitting/receiving antenna.

A BTS test unit is coupled to a transceiver unit by using two ports of a directional coupler in a RF front end unit, one of which is a forward signal port and the other is a reflected signal port. An out-door BTS is proposed to provide a service to a shadowing area, which may include an area blocked from a conventional radio wave by obstacles such as high buildings, the inside of a building, a highway edge and the vicinity of a golf course.

FIG. 1 is a schematic diagram illustrating an out-door base station transceiver subsystem (BTS) 2. As illustrated in FIG. 1, a base station transceiver subsystem (BTS) generally includes: a RF unit 4 for transmitting/receiving a RF signal via an antenna; a digital unit (DU) 6 for modulating/ demodulating a digital signal; and a rectifier unit 8 for transmitting a converted signal after converting an alternating current (AC) signal into a direct current (DC) signal.

The RF unit 4 is connected to three external antennas, two of which are receiving antennas 10, 12 and one of which is a transmitting antenna 14. Also, the RF unit 14 is connected to a leakage coaxial cable (LCX) 16 via a LCX interface unit in order to provide a service to an underground region such as a highway or subway tunnel, e.g., where signals propagated from antennas 10, 12, 14 cannot reach and where an additional antenna cannot easily be installed. The base station transceiver subsystem (BTS) 2 directly transmits and receives signals to and from a mobile station.

The out-door BTS is structured to use a high power amplifier (WHPA), and provides all functions of a conventional base station transceiver subsystem. That is, the out-door BTS provides a function for connection with a base station controller (BSC) through a cable, a function for wireless connection with mobile stations, a function for processing calls from mobile stations, and a function for providing information regarding a base station controller (BSC) and mobile stations.

FIG. 2 is a block diagram illustrating an out-door base station transceiver subsystem. The out-door base station transceiver subsystem (BTS) generally includes: a receiver front end unit (RXFEU) 20 for providing a RF signal to a transceiver unit after amplifying the RF signal; a transceiver front end unit (TXFEU) 24 for providing the RF signal to a transmitting antenna; a high power amplifier (HPA) 26 for amplifying a signal for transmission; a transceiver unit (XCVR) 22 for converting a RF signal into an intermediate frequency signal; a Transceiver Master Control Unit (TMCU) 28 for controlling the transceiver unit; an Analog Common Card (ACC) 30 for transmitting the sampled signal to a modulator/demodulator after sampling an analog intermediate frequency signal into a digital signal; a modulator/ demodulator 32 for modulating /demodulating the digitized signal; and an interface unit (IFU) 34 for interfacing the units such as the analog common card (ACC) and the transceiver master control unit (TMCU) with a base station controller (BSC).

The aforementioned out-door BTS uses one Frequency Assignment (FA) per sector to provide a service. As a result, the out-door BTS is unable to cover the whole area within a building or in a subway station, or for instance, a boundary between service areas. To cover non-served areas, another BTS must be established. However, in many cases it is impossible, or at least very costly, to establish an additional BTS. Additionally, a coaxial cable used as a transmission line between a base station transceiver subsystem and an antenna results in significant, undesirable signal transmission loss.

An object of the conventional out-door base station transceiver subsystem is to remove a shadowing area and to enhance speech quality. However, limited space and high costs are burdens which often interfere with achieving this objective using conventional out-door BTS.

U.S. Pat. No. 5,339,184 discloses a communication link interconnecting a base station to a plurality of remote antenna cells. The '184 patent discloses base station transceiver means for optically transmitting RF transmit signals and for receiving an optical uplink channel, so optical transmission is included in a micro cellular network.

U.S. Pat. No. 5,479,595 discloses a mobile telephony system for transmitting signals via two ways. Such a system utilizes an optic antenna tonsure a shadowing area where a RF signal can not reach, for instance, inside office buildings, factories, hospitals, etc.

SUMMARY OF THE INVENTION

An object of the present invention is to provide an out-door base station transceiver subsystem which utilizes a hybrid system of a high power amplifier supplying an RF antenna and an optic antenna. The out-door BTS. includes an interface unit and a duplex RF front end unit in order to distribute a signal transmitted from a high power amplifier to both a standard RF antenna and an optic antenna According to a preferred embodiment of the present invention, a duplex out-door base station transceiver subsystem utilizing a hybrid system of a high power amplifier and an optic antenna, includes a RF front end unit interfaced to an optic antenna; a receiver interface unit for transmitting a signal from an optic antenna to the RF front end unit; a transceiver unit for transmitting a transmit/receive signal to the RF front end unit; a BTS test unit coupled to the RF front end unit for performing a self-diagnosis of a BTS; and an optic antenna interface unit for connecting an optic antenna system with the receiver interface unit.

DETAILED DESCRIPTION OF PREFERRED EMBODIMENTS

The present invention will be described with reference to the detailed description and accompanying drawings.

A system of the present invention is a duplex system which transmits and receives signals via the same path. In a preferred embodiment of the present invention, an out-door base station transceiver subsystem interfaces a BTS to both a conventional RF antenna and an optic antenna for signal transmission. Several optic antennas can be interfaced to the BTS to replace conventional base station transceiver subsystems and thus, the hybrid out-door BTS of the present invention can provide a service of a high quality to the inside of buildings and underground installations such as subway stations, at a minimum cost. Preferably, optic cable is used to connect an optic antenna with the hybrid base station transceiver subsystem. The use of optic cable has advantages over RF coaxial cable in that signal transmission loss is significantly reduced.

To interface the optic antenna to the BTS, a RF front end unit of a base station transceiver subsystem includes a duplex antenna front end unit, a power divider and a power combiner respectively for dividing and combining signals to and from an optic antenna after receiving signals, and a low noise amplifier for amplifying a signal received from an optic antenna.

Figure 1:
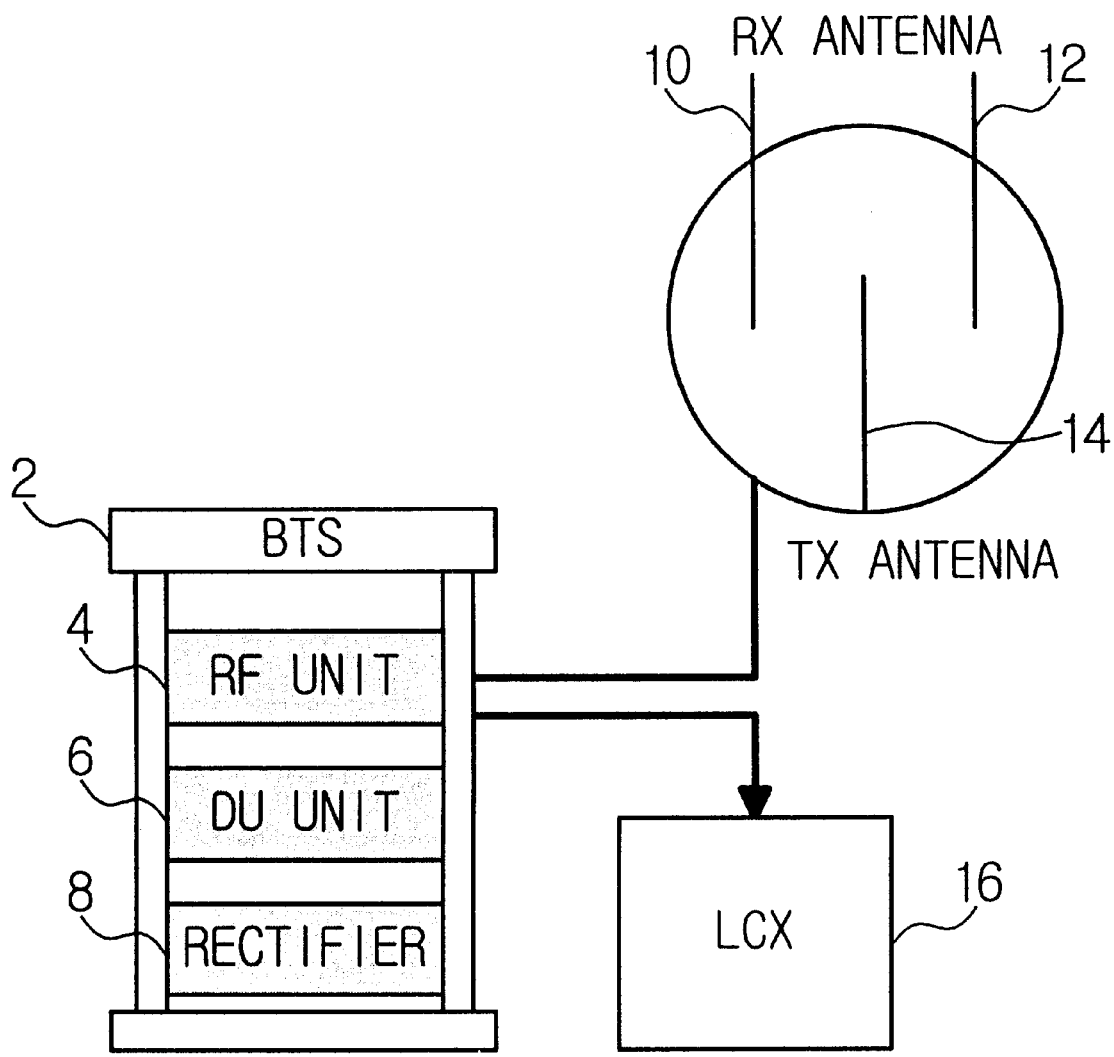
FIG. 1 is a schematic diagram illustrating an out-door base station transceiver subsystem (BTS) known in the prior art.
Figure 2:
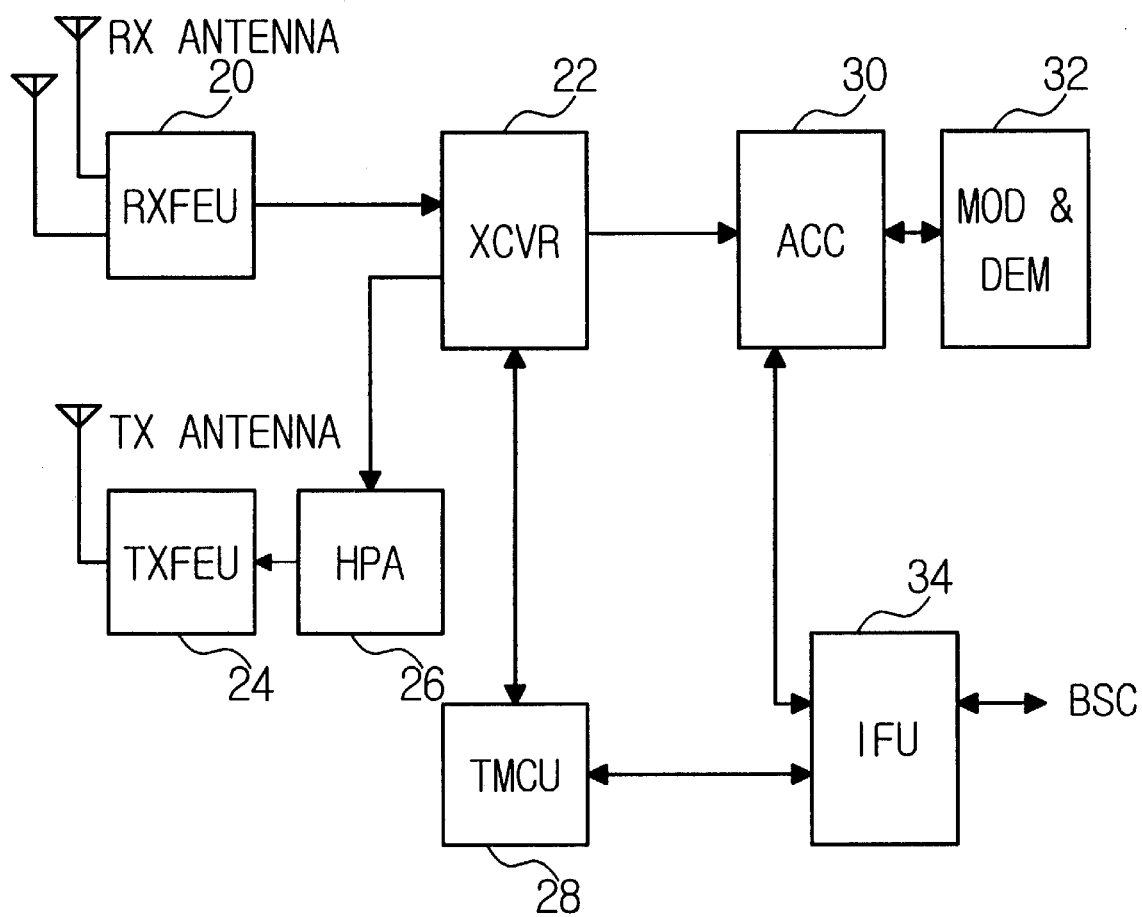
FIG. 2 is a block diagram illustrating an inside out-door base station transceiver subsystem (BTS).
Figure 3:
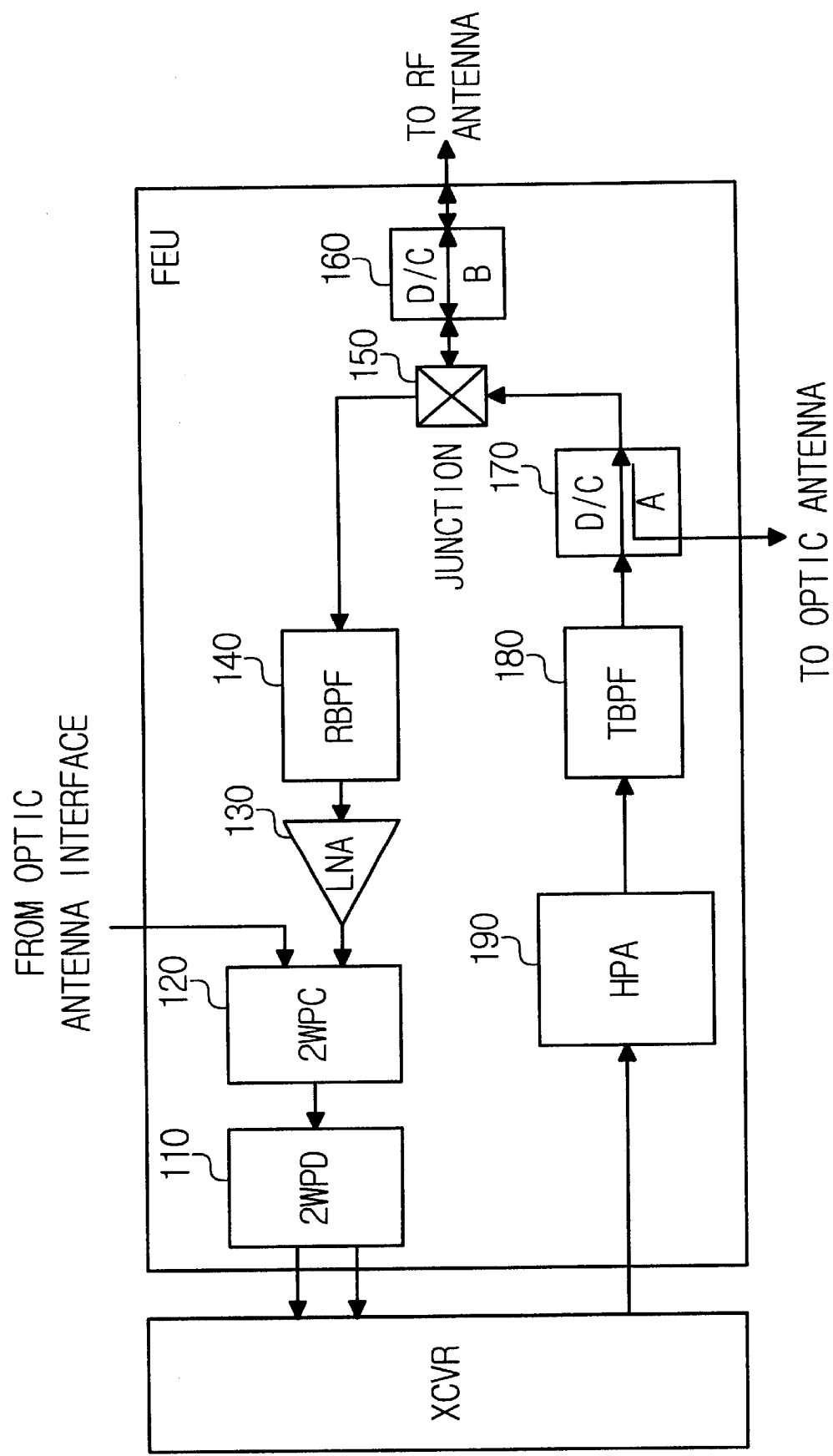
FIG. 3 is a block diagram illustrating a RF front end unit in an out-door BTS according to a preferred embodiment of the present invention.

FIG. 3 is a block diagram illustrating a RF front end unit in an out-door BTS formed in accordance with the present invention. As illustrated in FIG. 3, the RF front end unit includes: a high power amplifier (HPA) 190 for amplifying a signal from a transceiver unit; a transmit band pass filter (TBPF) 180 for passing signals in a transmission frequency band; a first directional coupler 170 for transmitting a portion of the transmission signal to an optic antenna interface 500; a second directional coupler 160 for connecting both a BTS test unit and a RF antenna with the RF front end unit. A junction 150 forms a common node in the transmitting path and a receiving path. A receiving band pass filter 140 is includes for removing out-of-band signals from the signal received from a conventional radio frequency antenna. This signal from filter 140 is amplified by a low noise amplifier 130 and is applied to a two-way power combiner (2 WPC) 120 for combining the signals. received via both an optic antenna and RF antenna. The combined signal is applied to a two-way power divider 110 for dividing the combined received signals to a transceiver unit.

The RF front end unit shown in FIG. 3 is preferably applied to a conventional BTS which is to be interfaced with an optic antenna. Consequently, the out-door BTS can be a hybrid system having high power amplifier feeding both an RF antenna and an optic antenna.

Figure 4:
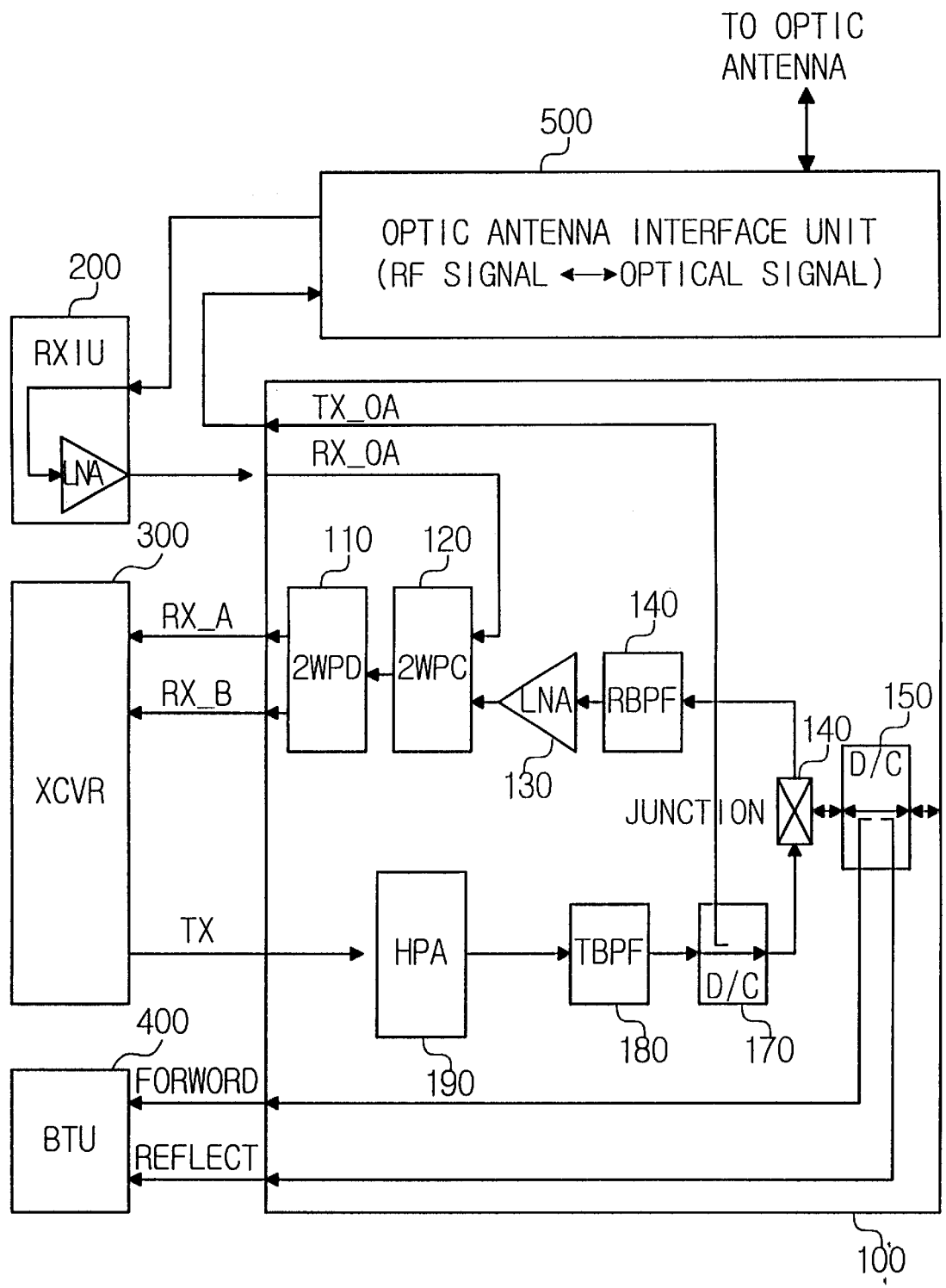
FIG. 4 is a block diagram illustrating an out-door BTS according to a preferred embodiment of the present invention.

FIG. 4 is a block diagram illustrating an out-door BTS according to a preferred embodiment of the present invention. The out-door BTS generally includes: a RF front end unit 100 for transmitting/receiving a signal; a receiver interface unit 200 for transmitting a signal to the RF front end unit 100 after amplifying the signal received from an optic antenna interface unit; a transceiver unit 300 for transferring a transmitted/received signal to the RF front end unit 100; a BTS test unit 400 coupled to the RF front end unit 100 for self-diagnosing a performance of a base station transceiver subsystem (BTS); and an optic antenna interface unit 500 for interfacing the RF front end unit with an optic antenna.

The above-mentioned base station transceiver subsystem (BTS) transmits a signal as follows. A signal is transmitted to a high power amplifier (HPA) 190 via a transceiver unit 300. The signal is amplified by the HPA 190 and is filtered by a transmit band pass filter 180. The filtered signal is applied to a first directional coupler 170. A portion of the filtered signal is delivered via the first directional coupler 170 to the optic interface unit 500, which converts the received RF signal into an optical signal for transmission by an optic antenna. The balance of the filtered signal (less signal losses) is delivered via a junction 150 to a second directional coupler 160. The directional coupler 160 is coupled to both a conventional RF antenna for transmission and a BTS test unit (BTU) 400, which performs a self-diagnosis of a BTS.

In contrast, the above-mentioned base station transceiver subsystem receives a signal from an optical antenna as follows. An optical signal, which is received from an optic antenna is coupled to the optic interface unit 500 via a fiber optic cable or other suitable optical conduit. The optic interface unit 500 converts the received optic signal into a suitable electrical signal. The electrical signal is preferably amplified by a low noise amplifier (LNA) of a receiver interface unit 200 and is delivered to the two-way power combiner (2WPC) 120 in the RF front end unit 100.

In addition, a conventional radio telephone signal, which is received through the conventional RF antenna via the second directional coupler 160 is filtered by a receiver band pass filter 140. The filtered signal is amplified by a low noise amplifier 130 and is delivered to the two-way power combiner 120. The signals received from an optic antenna and the conventional RF antenna are combined at the two-way power combiner 120 and the combined signal is divided and distributed by a two-way power divider 110 to two receiving paths of the transceiver unit 300.

Figure 5:
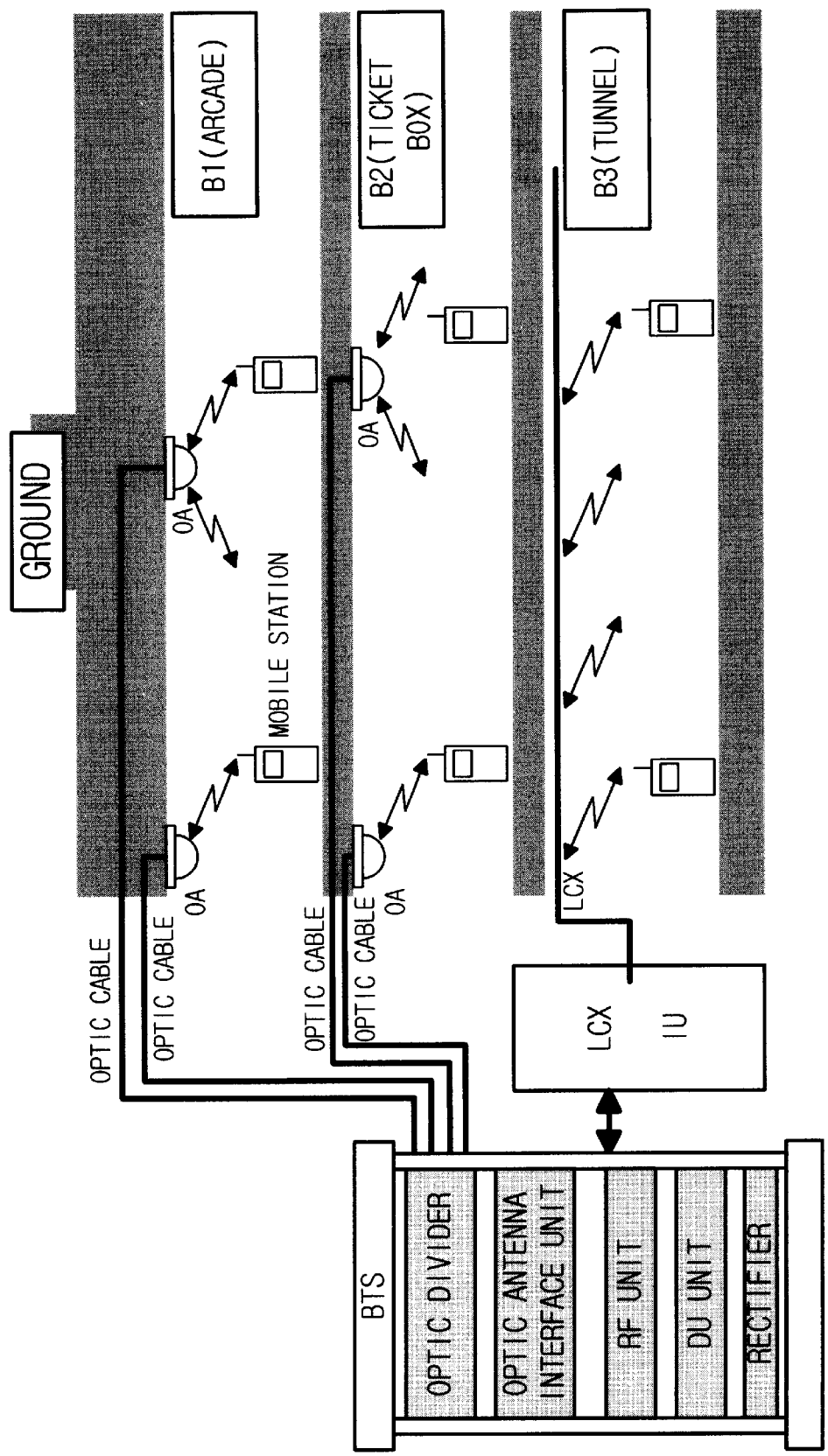
FIG. 5 is a pictorial diagram which illustrates an exemplary embodiment of an out-door BTS according to the present invention.

In a preferred embodiment, sixteen (16) optic antennas can be coupled to the optic antenna interface unit (500) via optic cable. As a result, the out-door BTS interfaced with optic antennas can provide high quality speech communication to several coverage areas. FIG. 5 illustrates an exemplary embodiment of an out-door BTS according to the present invention. The out-door BTS are connected via an optic divider coupled to optic cables to several optic antennas installed in a first underground level (B1), for example an arcade and to a second underground level, for example ticket box.

The optic antennas deliver a signal, which is transmitted to and received from a plurality of suitably equipped mobile stations, through optic cable to a base station transceiver subsystem (BTS). The BTS transmits and receives the signal using a hybrid system of a high power amplifier and an optic antenna.

In those cases where an optic antenna is difficult to install, for example in the third underground region (B3), a base station transceiver subsystem (BTS) can use a leakage coaxial cable (LCX) instead of optic antennas to communicate with mobile stations. The leaky cable has an associated interface unit for connecting to the BTS.

While the present invention is susceptible to various modification and alternative forms, specific embodiments thereof have been shown by way of example in the drawings and detailed description. It should be understood, however, that the present invention is not limited to the particular forms disclosed, but on the contrary, the intention is to cover all modifications, equivalents, and alternative falling within the spirit and scope of the invention as defined by the appended claims.

What is claimed is:

1. A duplex base station transceiver subsystem for utilizing both an optical antenna and radio frequency antenna to establish communications, comprising:
   an optic antenna interface unit including means to couple to an optic antenna;
   a RF front end unit;
   a receiver interface unit, said receiver interface unit being interposed between the optic antenna interface unit and said RF front end unit and transferring a signal therebetween;
   a base station transceiver subsystem (BTS) test unit coupled to said RF front end unit for performing a self-diagnosis of a BTS; and
   a transceiver unit operatively coupled to said RF front end unit and exchanging signals therewith.

2. A duplex BTS as set forth in claim 1, wherein said RF front end unit includes:
   a high power amplifier for amplifying a signal from a transceiver unit;
   a transmit band pass filter for filtering the amplified signal from said high power amplifier;
   a first directional coupler for delivering a portion of said filtered signal at said transmit band pass filter to said optic antenna interface unit;
   a second directional coupler for connecting said BTU and a radio frequency antenna with said RF front end unit;
   a junction coupled to said second directional coupler, for connecting said first directional coupler on a transmitting path with a receiver band pass filter on a receiving path;
   a receiver band pass filter for selecting frequency for a signal received via said junction and via said second directional coupler and said junction from the radio frequency antenna;
   a low noise amplifier for amplifying the filtered signal at said receiver band pass filter;
   a two-way power combiner for combining the amplified signal at said low noise amplifier and a signal received via said receiver interface unit from an optic antenna; and
   a two-way power divider for distributing the combined signal at said power combiner to said transceiver unit via two receiving paths.

3. A duplex BTS as set forth in claim 1, using a portion of power from said directional coupler for transmission.

4. A duplex BTS as set forth in claim 1, wherein said receiver interface unit further includes a low noise amplifier for amplifying a received signal, and delivering the amplified signal to said RF front end unit.

5. A duplex BTS as set forth in claim 1, wherein a plurality of optic antennas are coupled to said optic antenna interface unit.

6. A duplex BTS as set forth in claim 1, wherein said optical antenna is interfaced to said receiver interface unit using optical fibers as a cable.

7. A duplex BTS as set forth in claim 1, wherein said duplex BTS simultaneously operates said optic antenna and said high power amplifier.

8. A base station transceiver system including both optical and radio frequency communication facilities, the system comprising:
   a transceiver for receiving a first radio frequency signal and transmitting a second radio frequency signal;
   an amplifier circuit, said amplifier circuit receiving and amplifying said second radio frequency signal;
   a directional coupler coupled to said amplifier circuit;
   an optic interface unit, said optic interface unit receiving a first portion of the second radio frequency signal from said directional coupler, said optic interface unit converting said radio frequency signal to an optical signal for transport and transmission by an optical antenna, said optic interface unit also receiving optical signals from an attached optical antenna and converting the optical signals to radio frequency signals;
   an antenna interface for coupling the system to a radio frequency antenna, a radio frequency antenna coupled to said interface receiving a second portion of the second radio frequency signal from said directional coupler and radiating same, the antenna also receiving radio frequency signals and presenting the signals to the antenna interface; and
   means for combining and coupling said converted signals from said optic interface unit and the received signals presented to the antenna interface to said transceiver unit as the first radio frequency signal.

* * * * *